United States Patent [19]
Spridco et al.

[11] Patent Number: 5,544,539
[45] Date of Patent: Aug. 13, 1996

[54] GEAR DRIVE WITH ECCENTRIC SHIFT MECHANISM

[75] Inventors: Dale R. Spridco, DeForest; J. Marc Gruneberg, Madison, both of Wis.

[73] Assignee: GearTechnic Corporation, Madison, Wis.

[21] Appl. No.: 376,576

[22] Filed: Jan. 23, 1995

[51] Int. Cl.$^6$ ..................................................... F16H 3/34
[52] U.S. Cl. ............................................................. 74/353
[58] Field of Search ................................................ 74/353

[56] References Cited

U.S. PATENT DOCUMENTS

| | | | |
|---|---|---|---|
| 276,463 | 4/1883 | Powell | 74/353 |
| 324,955 | 8/1885 | Powell | 74/353 |
| 345,377 | 7/1886 | Gallup | 74/353 |
| 588,316 | 8/1897 | Billings | 74/353 |
| 684,433 | 10/1901 | Isler | 74/353 |
| 728,266 | 5/1903 | Mill | 74/353 |
| 1,659,426 | 2/1928 | Conradson | 74/353 |
| 1,924,559 | 8/1933 | Lathrop | 74/58 |
| 2,028,977 | 1/1936 | Gower | 74/352 |
| 3,150,533 | 9/1964 | Wallgren | 74/397 |
| 3,241,384 | 3/1966 | Grimm | 74/353 |
| 3,273,414 | 9/1966 | Boggs | 74/353 |
| 5,095,767 | 3/1992 | Spirdco et al. | 74/397 |

*Primary Examiner*—Dirk Wright
*Attorney, Agent, or Firm*—Quarles & Brady

[57] ABSTRACT

A gear drive with variable gear ratio employs a set of idler gear shafts eccentrically mounted on rotating disks surrounding input and output drive shafts. Simple rotation of the disks engages and disengages, in sequence, different idler gear assemblies as mounted on the disks, with and from both the input and output drive shafts providing a simple changing of gear ratio and eliminating unnecessary turning of idler shafts not used for the direct transmission of power.

9 Claims, 1 Drawing Sheet

5,544,539

GEAR DRIVE WITH ECCENTRIC SHIFT MECHANISM

FIELD OF THE INVENTION

This invention relates to gear drives and, in particular, to gear drives incorporating a shifting mechanism to change the gear ratio of the drive.

BACKGROUND OF THE INVENTION

It is known to change the gear ratio of a gear drive, i.e. the ratio between the number of revolutions of two connected shafts of the gear drive, by positioning multiple gears on a single splined shaft to slide into engagement or disengagement with other gears mounted on one or more parallel adjacent shafts. Such a gear drive is used in automotive transmissions, for example.

In an alternative design, providing a more compact drive and a simpler shifting procedure, a number of idler shafts and idler gears are simultaneously driven at different gear ratios by a single drive shaft. An output shaft is moved in a circular orbit to engage selected ones of the idler shafts.

This latter design suffers from the drawback that all the idlers are constantly in motion and the input and output shafts are both unaligned.

SUMMARY OF THE INVENTION

The present invention provides a compact gear drive that avoids the problems of the above prior art by using multiple idler gears but disengaging all but one set of idler gears at any given time. The design of the present invention also permits alignment of an input and output shaft without additional gearing.

Generally, the present invention recognizes that a proper positioning of the first and second drive shafts to both be eccentric with respect to the orbit of the idler gear sets, and permits the eccentric orbit of those idler gear sets to disengage the idler gear sets from both of the input and output shafts. This positioning permits the first and second drive shafts to be aligned.

Specifically then, the invention is a gearbox having a first drive shaft extending along a first drive shaft axis supporting a coaxial first drive gear and a coaxial second drive gear and a second drive shaft extending along a second drive shaft axis and supporting a coaxial third drive gear. A shaft carrier is mounted to turn about a carrier axis to a first and second angle, the carrier axis displaced from, but substantially parallel to the first and second drive shaft axes. Supported on the shaft carrier is a first idler shaft attached to a coaxial first and second idler gear and a second idler shaft attached to a coaxial third and fourth idler gear.

The idler shafts are positioned on the shaft carrier so that (i) the first idler gear is engaged with the first drive gear at a first angle of the shaft carrier and is disengaged from the first drive gear at a second angle of the shaft carrier;

(ii) the second idler gear is engaged with the third drive gear at the first angle and is disengaged from the third drive gear at the second angle;

(iii) the third idler gear is disengaged from the second drive gear at the first angle and is engaged with the second drive gear at the second angle; and (iv) the fourth idler gear is disengaged from the third drive gear at the first angle and is engaged with the third drive gear at the second angle.

Thus, the eccentricity of the axis of the shaft carrier with respect to the axis of the drive shaft is used to completely disengage the idler gear set that is not being employed to transmit power.

It is thus one object of the invention to provide a compact gear drive that offers a selection of gear ratios with a simple rotation of the shaft carrier, but that avoids unnecessary heating and oil churning resulting from the constant rotation of a number of unused idler gear sets.

The first and second drive shaft axes may be the same.

Thus, it is another object of the invention to provide a gear box whose input and output shafts are aligned without the need for additional offsetting gears.

The positioning of the idler shafts on the shaft carrier may be such that drive and idler gears mesh at a point substantially along a line passing through a drive shaft axis and the carrier axis.

Thus, it is yet another object of the invention to provide a shifting mechanism that preserves proper clearance between engaging gears. Selecting the point of meshing to be in line with the offset between the drive shaft axis and carrier axis causes the gear to mesh as their relative motion is tangent to a line between their centers. In this way, motion of the gears in either direction from the meshing point does not further decrease their separation preventing binding or excessive wear in the gears.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
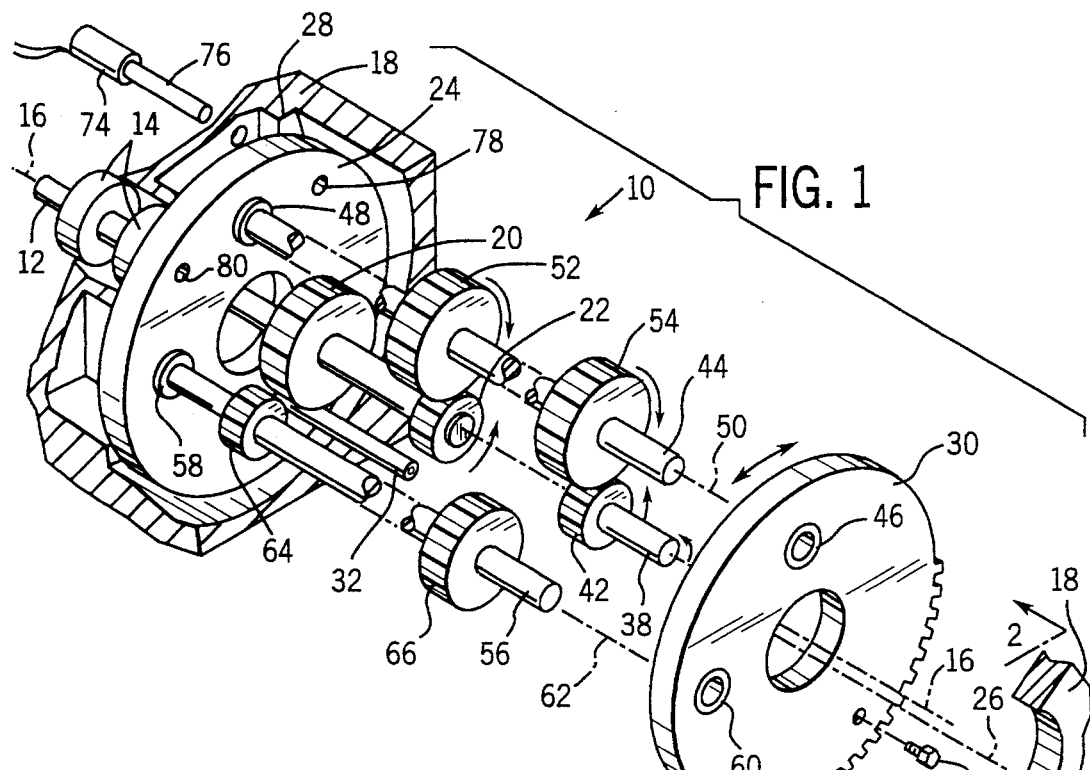
FIG. 1 is a cutaway, exploded, perspective view of the gear drive of the present invention showing aligned drive shafts surrounded by eccentrically mounted idler shafts.

Referring to FIG. 1, the gear drive 10 of the present invention includes a first drive shaft 12 supported by a bearing pair 14 at one end of a housing 18 to rotate freely about a drive shaft axis 16. One end of the first drive shaft 12 protrudes out of the housing 18 to be attached to rotating equipment. The other end of the drive shaft 12 extends inside the housing 18 supported against forces perpendicular to the drive shaft axis 16 by the bearing pair 14.

The inner end of the drive shaft 12 passes through and is attached to a first drive gear 20 and a second drive gear 22. First and second drive gears 20 and 22 may be conventional helical gears and have different radii so as to provide different gear ratios for the drive 10 as will be described below.

A first shaft carrier 24, in the form of an annular disk with center aperture, admits through the center aperture the drive shaft 12 and the first and second drive gears 20 and 22 so as to be positioned around the drive shaft 12 before the first and second gears 20 and 22 but after the bearing pair 14. The outer periphery of the first shaft carrier 24 is rotatably supported by the inner surface of the housing 18 against a flange 28 of the housing 18 so that the first shaft carrier 24 is restrained to rotate within a plane perpendicular to the drive shaft axis 16 about a carrier axis 26. The carrier axis 26 is generally parallel to but displaced from the drive shaft axis 16, and as depicted is below the drive shaft axis 16.

The first shaft carrier 24 is connected to a second shaft carrier 30 of similar dimensions but displaced further along the carrier axis 26 past the first and second gears 20 and 22 to the other end of the housing 18 but within the housing 18. The first and second shaft carriers 24 and 30 are separated and attached in parallel opposition to each other by rigid standoffs 32 extending between the first and second shaft carriers 24 and 30 and spaced at intervals around first and second shaft carriers 24 and 30 (in FIG. 1 only one standoff 32 is shown for clarity). The standoffs 32 are bolted to the inner face of the first shaft carrier 24 and extending perpendicularly to that face and parallel to the carrier axis 26 to the inner face of the second shaft carrier 30 to be attached by bolts 34.

Like the first shaft carrier 24, the second shaft carrier 30 is supported by the housing and a flange on the housing (not shown) to rotate with the first shaft carrier 24, as a unit, about carrier axis 26, and to define a volume therebetween.

A second drive shaft 38, aligned with the drive shaft axis 16, passes through an opening 40 in the end of the housing 18 opposite bearing pair 14. This second drive shaft 38 extends into volume 36 via the center aperture of the second shaft carrier 30 and supports within the volume 36 a third drive gear 42 coaxially attached to the second drive shaft 38. Third drive gear 42 thus turns about the same drive axis 16 as the first and second drive gears 20 and 22 but is otherwise independent of drive gears 20 and 22.

The second drive shaft 38, in a preferred embodiment, is supported by bearings in an external apparatus (not shown), however, it will be understood to those of ordinary skill in the art that bearings similar to bearing pair 14 may be incorporated into the housing at opening 40 to provide support for drive shaft 38 in a manner similar to that provided by bearing pair 14 to drive shaft 12.

A first idler shaft 44 generally parallel to the drive shaft axis 16 but displaced therefrom is supported at each end by bearings 46 between the first and second shaft carriers 24 and 30 so as to turn freely on those bearings 48 and 46 along a first idler axis 50. A first idler gear 52 mounted to the first idler shaft 44 is positioned to turn within a plane perpendicular to the drive shaft axis 16 aligned with second drive gear 22. A second idler gear 54 attached to the idler shaft 44 turns with rotation of the first idler gear 52 within a plane perpendicular to the drive shaft axis 16 and aligned with third drive gear 42.

A second idler shaft 56 also extends between the first and second shaft carriers 24 and 30 supported by bearings 58 and 60 (attached to the first and second shaft carriers 24 and 30, respectively) to turn about a second idler axis 62 intersecting the first and second shaft carriers 24 and 30 at an angle approximately 90° from the intersection between those carriers 24 and 30 and the first idler axis 50 measured about carrier axis 26.

A third idler gear 64 is affixed to the second idler shaft 56 to turn within a plane perpendicular to the drive shaft axis 16 and aligned with the first drive gear 20. A corresponding fourth idler gear 66 is also affixed to the second idler shaft 56 to turn with rotation of the third idler gear 64 within a plane perpendicular to drive shaft axis 16 and aligned with third drive gear 42 and second idler gear 54.

A rotary actuator 68 having a spur gear 70 attached to a rotating shaft of the actuator 68 engages rack teeth 72 cut in the periphery of second shaft carrier 30 so that the actuator 68 may rotate the first and second shaft carriers 24 and 30 about the carrier axis 26 in response to an electrical or pneumatic command signal.

A solenoid 74 having a plunger 76 extending parallel to the drive shaft axis 16 but displaced therefrom is attached to the housing 18 at the end near the bearing pair 14 so that the plunger 76 may be extended through the housing 18 to engage a first or second stop hole 78 or 80 bored through the first shaft carrier 24. Upon the excitation of the rotary actuator 68 by the electrical or pneumatic command signal, the spur gear 70 rotates the shaft carriers 24 and 30, and the idler axes 56 and 44 between two positions each of which aligns one of holes 78 and 80 with the plunger 76 of the solenoid 74. At these positions, the plunger 76 may be engaged with the hole 78 or 80 to prevent further rotation of the first and second shaft carriers 24 and 30.

Figure 2:
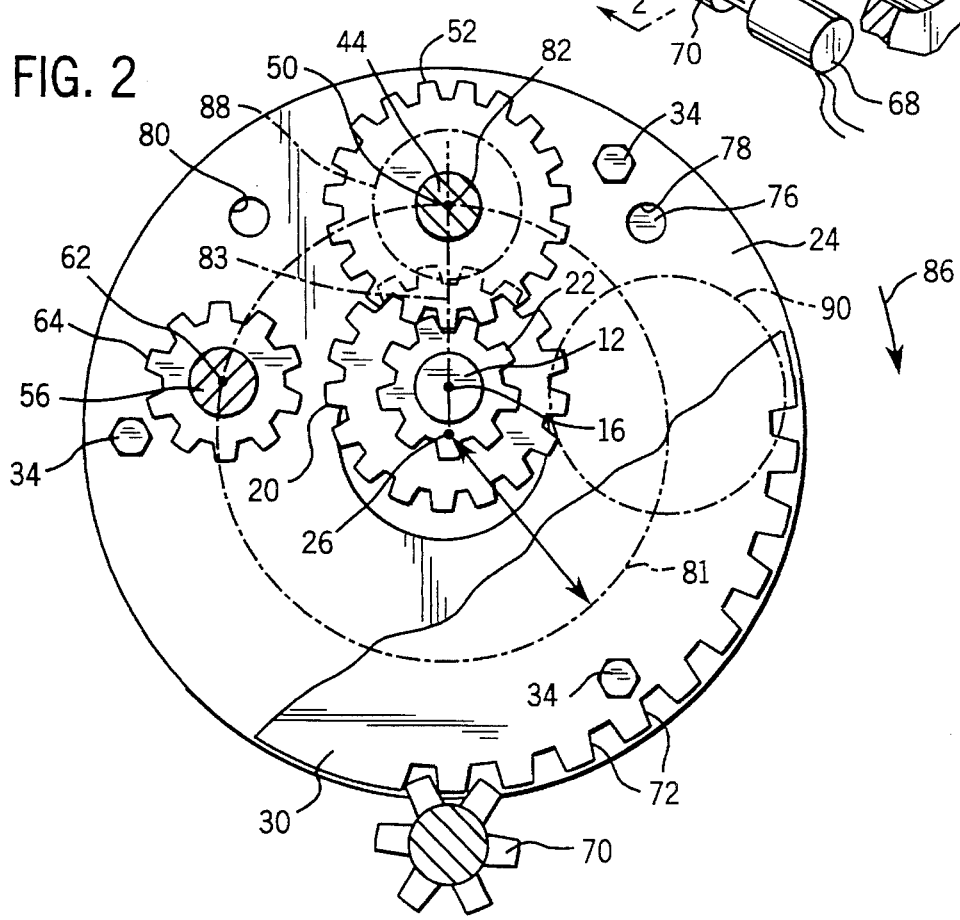
FIG. 2 is a cross-sectional view along line 2—2 of FIG. 1 showing the separation between the axis of rotation of the drive shafts and the axis of rotation of the shaft carrier holding the idler shafts.

Referring now to FIGS. 1 and 2, the displacement of the carrier axis 26 beneath the drive shaft axis 16 causes the first and second idler shafts 56 and 44 to follow an eccentric orbit 81 about the drive shaft axis 16 and thus about the first drive gear 20 and second drive gear 22. This orbit 81 is closest to the drive shaft axis 16 at a perigee point 82 which corresponds to the intersection of the orbit 81 with a line 83 through the carrier axis 26 and drive shaft axis 16 intersecting the orbit 81 on the opposite side of the drive shaft axis 16 from the carrier axis 26.

When the center of first idler shaft 44 is aligned with perigee point 82, the center of the first idler shaft 44 is closest to the drive shaft axis 16 and first idler gear 52 meshes with the second drive gear 22. The relative number of teeth between the first idler gear 52 and the second drive gear 22 may be selected to be of any ratio that permits meshing at this point. At this first angular position, hole 78 aligns with the plunger 76, the latter which may be engaged to prevent further rotation of the first shaft carrier 24.

Also at this position, second idler gear 54 is engaged with third drive gear 42. Yet the eccentricity of the orbit 81 is sufficient so that third and fourth idler gears 64 and 66 are completely disengaged from drive gears 20 and 42.

Rotation of the first and second shaft carriers 24 and 30 in either direction from this first position causes the idler axis 50 to move away from the drive shaft axis 16. Thus, if proper gear clearance is obtained between first idler gear 52 and second drive gear 22 at the perigee point 82, it can be assured that binding between these gears will not occur for minor deviations of the first shaft carrier 24 from this first position.

In order to change the ratio of the gear drive 10, e.g., between the drive shaft 12 and the drive shaft 38, first and second shaft carriers 24 and 30 may be rotated from the first position in a clockwise direction indicated by arrow 86 until third idler gear 64 moves to the position indicated by phantom line 88 where idler axis 62 is aligned with perigee point 82 and third idler gear 64 meshes with first drive gear 20. Similarly, fourth idler gear 66 moves into engagement with the third drive gear. In the preferred embodiment, where the second drive shaft 38 is aligned with the first drive shaft 12, second and fourth idler gears 54 and 66 are of the same size.

At the same time, first idler gear 52 moves away from the drive shaft axis 16 following the orbit 81 to the position indicated by phantom line 90 and second idler gear 54 moves away from third drive gear 42 so that gears 52 and 54 are completely disengaged from other gears.

The displacement between the carrier axis 26 and the drive shaft axis 16 determines the extent to which idler gears approach and retreat from the drive shaft axis 16 as they follow orbit 81 and can be adjusted to ensure that complete disengagement of gears occur when their axes are moved from the perigee point 82.

Thus, a simple rotary motion of the first and second shaft carriers 24 and 30, which may be accomplished by a simple actuator 68, serves to change the gear ratio of the drive unit while ensuring that idler shafts and gears not used for power transmission are completely disengaged to reduce wear and heating.

Referring again to FIG. 1, the housing 18 surrounds the above described gears of the gear drive 10 to contain lubricating oil to prevent contamination of the drive mechanism by foreign matter and to provide a bearing surface for shaft carriers as will be described.

The above description has been that of a preferred embodiment of the present invention. It will occur to those that practice the art that many modifications may be made without departing from the spirit and scope of the invention. For example the first and second drive shafts need not be aligned along a single axis. Further, additional idler shafts may be positioned along the orbit 80 to provide greater numbers of different gear ratios. In order to apprise the public of the various embodiments that may fall within the scope of the invention, the following claims are made.

We claim:

1. A gearbox comprising:
   (a) a housing
   (b) a first drive shaft extending into the housing to turn with respect to the housing along a first drive shaft axis supporting a coaxial first drive gear and a coaxial second drive gear;
   (c) a second drive shaft extending into the housing to turn with respect to the housing along a second drive shaft axis supporting a coaxial third drive gear;
   (d) a shaft carrier supported at its outer edge against an inner surface of the housing to turn about a carrier axis to a first and second angles, the carrier axis displaced from the first and second drive shaft axes;
   (e) a first idler shaft supported by the shaft carrier at a first position on the shaft carrier and having mounted thereon a coaxial first and second idler gear to follow an orbit about the first and second drive shaft axes with turning of the shaft carrier between the first and second angles whereby:
      (i) the first idler gear is engaged with the first drive gear at the first angle and is disengaged from the first drive gear at the second angle; and
      (ii) the second idler gear is engaged with the third drive gear at the first angle and is disengaged from the third drive gear at the second angle;
   (f) a second idler shaft supported by the shaft carrier at a second position on the shaft carrier and having mounted thereon a coaxial third and fourth idler gear to follow an orbit about the drive gear with turning of the shaft carrier between the first and second angles wherein:
      (i) the third idler gear is disengaged from the second drive gear at the first angle and is engaged with the second drive gear at the second angle;
      (ii) the fourth idler gear is disengaged from the third drive gear at the first angle and is engaged with the third drive gear at the second angle.

2. The gearbox of claim 1 wherein the first and second drive shaft axes are the same.

3. The gearbox of claim 1 wherein the first idler gear and the first drive gear engage at the first angle at a point substantially along a line passing through the first drive shaft axis and the carrier axis.

4. The gearbox of claim 1 wherein the second idler gear and the third drive gear engage at the first angle at a point substantially along a line passing through the second drive shaft axis and the carrier axis.

5. The gearbox of claim 1 wherein the third idler gear and the second drive gear engage at the second angle at a point substantially along a line passing through the first drive shaft axis and the carrier axis.

6. The gearbox of claim 1 wherein the fourth idler gear and the second drive gear engage at the second angle at a point substantially along a line passing through the second drive shaft axis and the carrier axis.

7. A gearbox comprising:
   (a) a first drive shaft extending along a first drive shaft axis supporting a coaxial first drive gear and a coaxial second drive gear;
   (b) a second drive shaft extending along a second drive shaft axis supporting a coaxial third drive gear;
   (c) a shaft carrier mounted to turn about a carrier axis to a first and second angles, the carrier axis displaced from the first and second drive shaft axes;
   (d) a first idler shaft supported by the shaft carrier at a first position on the shaft carrier and having mounted thereon a coaxial first and second idler gear to follow an orbit about the first and second drive shaft axes with turning of the shaft carrier between the first and second angles whereby:
      (i) the first idler gear is engaged with the first drive gear at the first angle and is disengaged from the first drive gear at the second angle; and
      (ii) the second idler gear is engaged with the third drive gear at the first angle and is disengaged from the third drive gear at the second angle;
   (e) a second idler shaft supported by the shaft carrier at a second position on the shaft carrier and having mounted thereon a coaxial third and fourth idler gear to follow an orbit about the drive gear with turning of the shaft carrier between the first and second angles wherein:
      (i) the third idler gear is disengaged from the second drive gear at the first angle and is engaged with the second drive gear at the second angle;
      (ii) the fourth idler gear is disengaged from the third drive gear at the first angle and is engaged with the third drive gear at the second angle;
   including a rotary actuator engaging the shaft carrier to move the shaft carrier between the first and second positions according to a command signal.

8. The gearbox of claim 1 wherein the shaft carrier includes a first and second opening and including further;
   a linear actuator positioned to drive a locking pin into engagement with one of the first and second openings when the shaft carrier is in one of the first and second angles to prevent movement of the shaft carrier in orbit about the first and second drive shaft axes.

9. The gearbox of claim 1 wherein the second and fourth idler gears have the same number of teeth.

* * * * *